(12) United States Patent
Volkmann et al.

(10) Patent No.: US 7,753,402 B2
(45) Date of Patent: Jul. 13, 2010

(54) AIR BAG ASSEMBLY AND CLIP THEREFOR

(75) Inventors: Matthias Volkmann, Kronberg (DE); Volker Hofmann, Frankfurt (DE)

(73) Assignee: Key Safety Systems, Inc., Sterling Heights, MI (US)

( * ) Notice: Subject to any disclaimer, the term of this patent is extended or adjusted under 35 U.S.C. 154(b) by 308 days.

(21) Appl. No.: 11/858,630

(22) Filed: Sep. 20, 2007

(65) Prior Publication Data

US 2008/0084050 A1    Apr. 10, 2008

Related U.S. Application Data

(60) Provisional application No. 60/828,679, filed on Oct. 9, 2006.

(51) Int. Cl.
   *B60R 21/16* (2006.01)
(52) U.S. Cl. ............ 280/728.2; 24/295
(58) Field of Classification Search ........... 24/293–295; 280/728.2, 730.2
   See application file for complete search history.

(56) References Cited

U.S. PATENT DOCUMENTS

| | | | |
|---|---|---|---|
| 1,229,668 A | | 6/1917 | Soltysik et al. |
| 2,265,957 A | | 12/1941 | Tinnerman |
| 2,670,512 A | | 3/1954 | Flora |
| 2,692,414 A | | 10/1954 | Ougljesa |
| 3,441,986 A | | 5/1969 | Pritchard |
| 4,595,325 A | | 6/1986 | Moran et al. |
| 5,186,517 A | * | 2/1993 | Gilmore et al. ............. 296/214 |
| 5,756,004 A | * | 5/1998 | Brezinski ..................... 252/394 |
| 5,873,690 A | | 2/1999 | Danby et al. |
| 6,095,734 A | | 8/2000 | Postadan et al. |
| 6,141,837 A | | 11/2000 | Wisniewski |
| 6,565,116 B1 | | 5/2003 | Tajima et al. |
| 6,857,168 B2 | | 2/2005 | Lubera et al. |
| 6,991,255 B2 | | 1/2006 | Henderson et al. |
| 7,083,188 B2 | | 8/2006 | Henderson et al. |
| 7,086,125 B2 | * | 8/2006 | Slobodecki et al. ........... 24/295 |
| 7,120,971 B2 | | 10/2006 | Osterland et al. |

(Continued)

FOREIGN PATENT DOCUMENTS

DE    19812737 A1    5/1999

(Continued)

*Primary Examiner*—Paul N. Dickson
*Assistant Examiner*—Robert A Coker
(74) *Attorney, Agent, or Firm*—Markell Seitzman

(57) ABSTRACT

An air bag assembly mounting system comprising: a fastener having a base plate with a front side and a rear side, a resilient expansion element along the rear side of the base plate which is configured to extend through an opening in a structural member of a vehicle so as to clamp the structural member of the vehicle and through a portion of an air bag or an air bag cover between the rear side of the base plate and the expansion element, the resilient expansion element comprising two co-acting resilient clips each having a center leg extending from the back plate and a resilient outer leg resiliently supported by the center leg; the outer leg, at a distal end, including extending wings which during assembly to the structural member rotate and over-travel the center leg to reduce the dimension between the wings of one of the outer legs and the wings of the other of the outer legs.

14 Claims, 5 Drawing Sheets

U.S. PATENT DOCUMENTS

| | | | |
|---|---|---|---|
| 7,156,413 B2 | 1/2007 | Fischer et al. | |
| 7,267,361 B2 | 9/2007 | Hofmann et al. | |
| 2003/0164607 A1 | 9/2003 | Ronne et al. | |
| 2004/0040124 A1 | 3/2004 | Lubera et al. | |
| 2005/0044672 A1 * | 3/2005 | MacPherson et al. | 24/293 |
| 2005/0217083 A1 | 10/2005 | Tashima et al. | |

FOREIGN PATENT DOCUMENTS

| | | |
|---|---|---|
| DE | 20050225061 A1 | 10/2005 |
| EP | 1291534 A | 3/2003 |
| EP | 0980796 B | 6/2006 |

\* cited by examiner

AIR BAG ASSEMBLY AND CLIP THEREFOR

BACKGROUND AND SUMMARY OF THE INVENTION

This application claims the benefit of U.S. Provisional Application 60/828,679, filed on Oct. 9, 2006. The disclosure of the above application is incorporated herein by reference.

The present invention relates to a fastener for fastening an air bag such as a curtain air bag (CAB) to a structural member of a vehicle such as the vehicle's roof rail.

The present invention includes a fastener for removably securing an air bag, which is part of an assembly, to a structural member of a vehicle such as the vehicle's roof rail or seat frame. The fastener comprises a base plate with a front side and a rear side; the rear side acts as a stop surface. The fastener also includes a resilient snap-in member. Each fastener has two opposing and coacting resilient expansion elements (also referred to as clips or clamps), which generally extend from the rear side and are designed to clamp to a mounting surface such as a thin plate or plate-like structure of a structural member; when clamped the thin plate is between the stop or clamping surface and the base plate of the fastener. The air bag is arranged between the rear side of the base plate and the structural member and with the clip portion of the fastener extending through an opening in a tab or border portion of the air bag. In the preferred embodiment of the invention the fastener is used to fasten the air bag to the vehicle; however, the fastener of the present invention can be used to secure components other than air bags to various mounting surfaces. The invention optionally includes a tool that can be used to displace each resilient clip to a configuration permitting removal of the fastener from the mounting surface. Once removed from the mounting surface, the fastener can be reused as it is not damaged during removal or disassembly.

DETAILED DESCRIPTION OF THE DRAWINGS

Figure 5A:
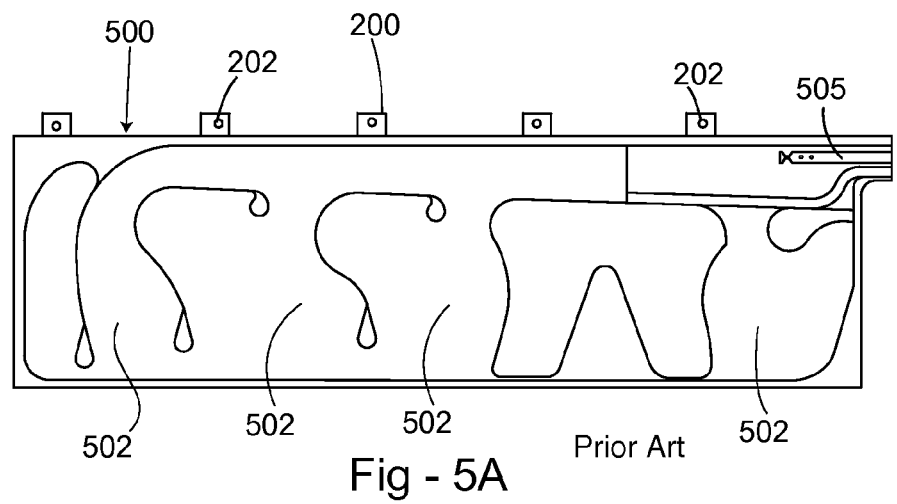
FIGS. 5A and 5B show a curtain air bag mounted to a structural member such as a roof rail of a vehicle.
Figure 5B:
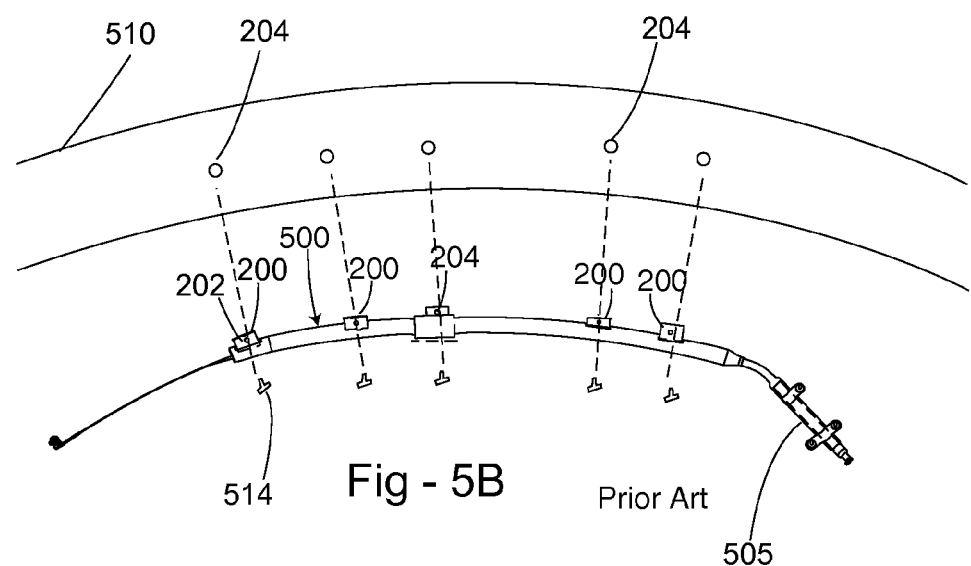

Reference is made to FIGS. 5A and 5B, which diagrammatically illustrate a typical curtain air bag 500 having one or more inflatable chambers 502. The air bag includes a plurality of tabs 200, each of which has a fastener receiving opening 202 for receipt of the fastener 514 used to secure the curtain air bag to the vehicle's roof rail. An inflator is shown by numeral 505. FIG. 5B diagrammatically illustrates air bag 500 in a rolled or folded configuration prior to being secured to the vehicle roof rail 510. The roof rail includes a like plurality of equally spaced fastener receiving openings 204. Each of a plurality of fasteners 514 is inserted through a corresponding fastener opening 202 in tab 200 and through an opening 204. As can be appreciated, the tab 200 can be positioned above the main portion of the air bag that has been folded or under the folded portion of the air bag. If the tabs are installed under the folded portion of the air bag after insertion of the fasteners to the mounting surface, the folded portion of the air bag falls down and covers the fasteners and tabs. Alternatively, if the air bag is mounted to the mounting surface with the tabs positioned above the folded portion of the air bag and the fasteners inserted into the tabs, the folded portion of the air bag remains below the tabs and fasteners (both installations are known in the art).

FIGS. 2A-2F show a variety of views of a fastener 70. The fastener 70 comprises a base plate or member 72 having a center portion 72a and lateral wings or sections 72b and 72c. Each lateral section is bent or bendable relative to the center portion (see FIG. 2D) to provide a degree of added resiliency to these lateral sections enabling these sections to flex when the fastener is mounted to a mounting surface to enable a good and sufficient clamping action so that air bag 500 is secured to the mounting surface. The fastener in the illustrated embodiment is symmetrical about centerline or vertical axis 73, as well as about a horizontal axis 74. Each clip is also arranged along another axis 75 disposed generally 90 degrees to axes 73 and 74. Plate or member 72 includes a front side 76 and a rear side 78. In the installed position the front side faces the passenger compartment of the vehicle (that is with the product such as an air bag installed at the roof rail).

The front side may include, as needed, a strengthening rib 80, which can be stamped or integrally formed thereon. In the preferred embodiment the fastener is a one-piece metal stamping or integrally molded or cast using metal or plastic. The strengthening rib 80 is formed on the center portion 72a. Each lateral section or wing 72b and 72c is pre-bent or partially folded about two bend lines or features 131 and 133 resulting in a first bent or flared portion 130 extending from bent line or feature 133 to bend line or feature 131 and a second bent or flared portion 132 extending outwardly beyond bend line 131. Each lateral section is configured to bend about the fold or bend features 131 and 133. The rib 80, as mentioned, stiffens the center portion 72, which encourages the flared portions 130 and 132 to flex at the bend features 131 and 133. Reference is briefly made to FIG. 2C; numeral 80a (shown as a phantom arc) relates that the rib need not be symmetrically placed along the back of the fastener and can be off-set relative to axis 73 or 74. Placing the rib 80a in an off-set manner increases the relative stiffness of the fastener along axis 74. Additionally, phantom lines 72d show that the wings 72b and 72c need not be the same size.

Extending from the rear side 78 of the base plate or member 72 is a resilient snap-in member 90 comprising two symmetrically placed and constructed expansion elements, clips or clamps 90a and 90b. Each clip 90a and 90b is integrally formed with the base plate or member 72. Each clip 90a and

90b includes a first or center leg 100 that extends away from the center portion 72a of the base plate or member 72 along axis 75. The root or base region 102 of each center leg is formed as a bent-over part of the center leg, which in essence was separated from the center portion 72a when the fastener was stamped. Root 102 includes an opening 104, which facilitates the bending-over of the center leg and use of a removal tool 600 as discussed below. Each clip 90a and 90b further includes an outer leg 106 resiliently extending and oppositely directed from the center leg via a curved corner 108 formed in part by the center and outer legs. The outer leg can also be considered as an extension of the center leg.

Figure 2A:
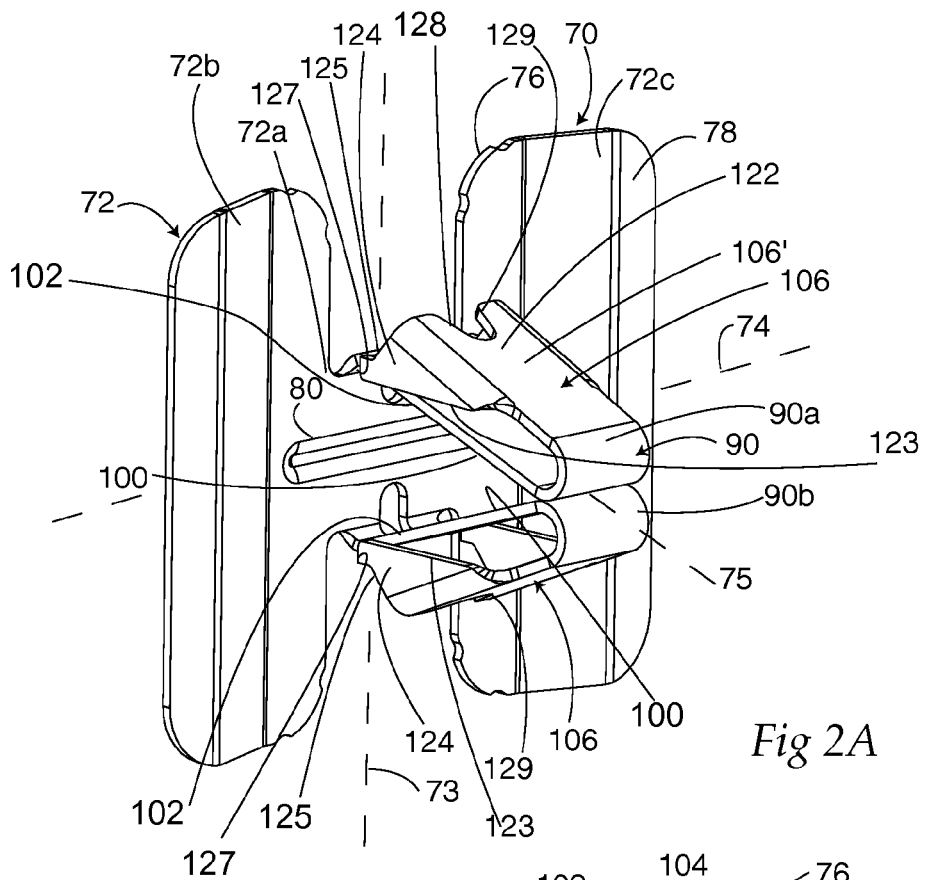
FIG. 2A is a rear isometric view of a fastener used in the present invention.
Figure 2B:
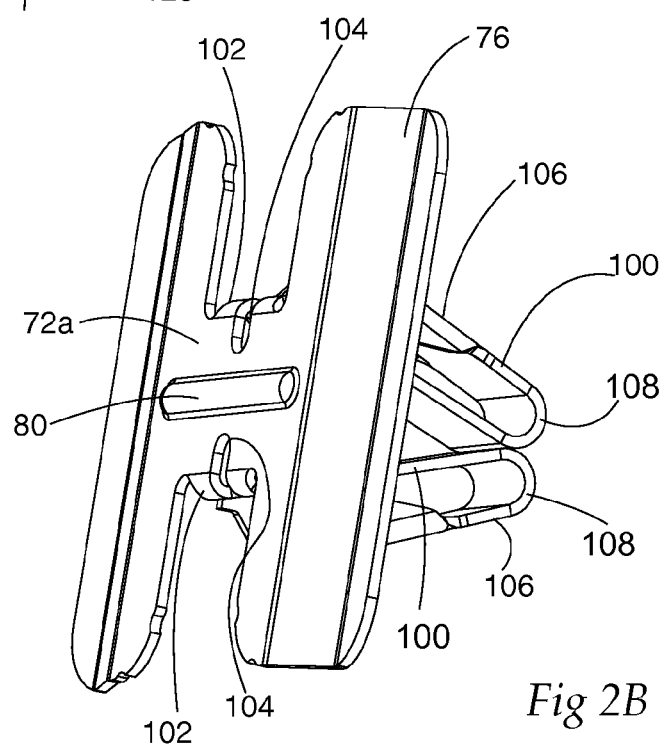
FIG. 2B is a front isometric view of the fastener.
Figure 2C:
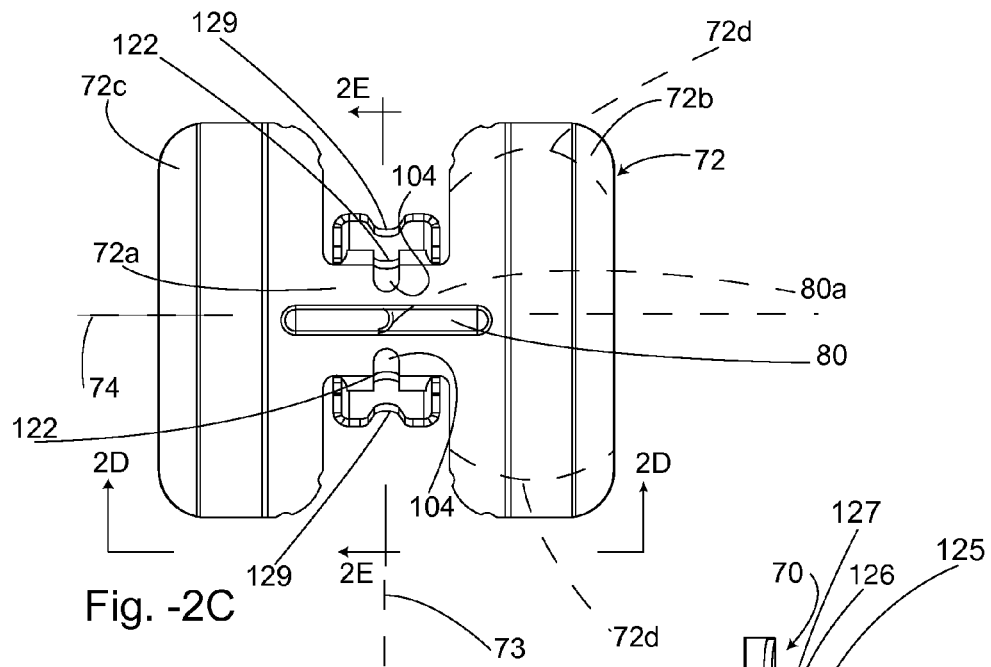
FIG. 2C is a front view of the fastener.
Figure 2D:
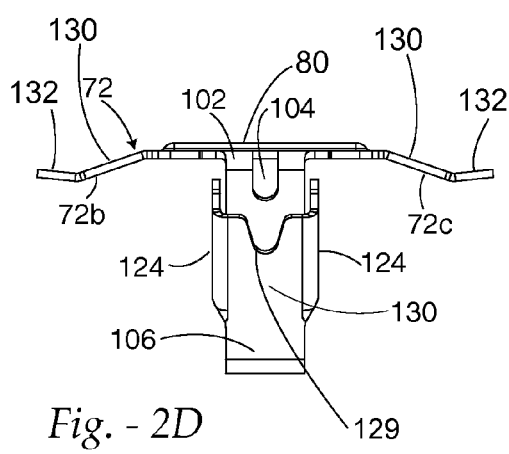
FIG. 2D is a top (or bottom) view of the fastener.
Figure 2E:
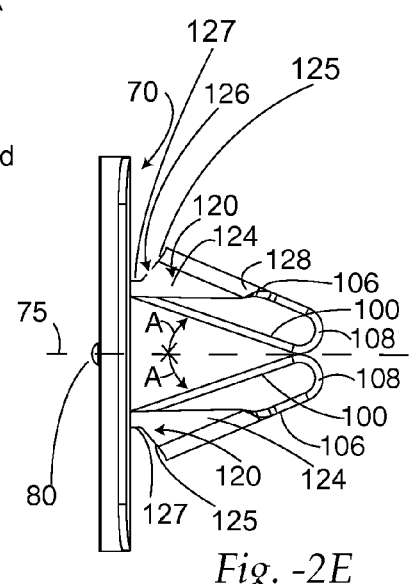
FIG. 2E is a right side view (or left side view) of the fastener.
Figure 2F:
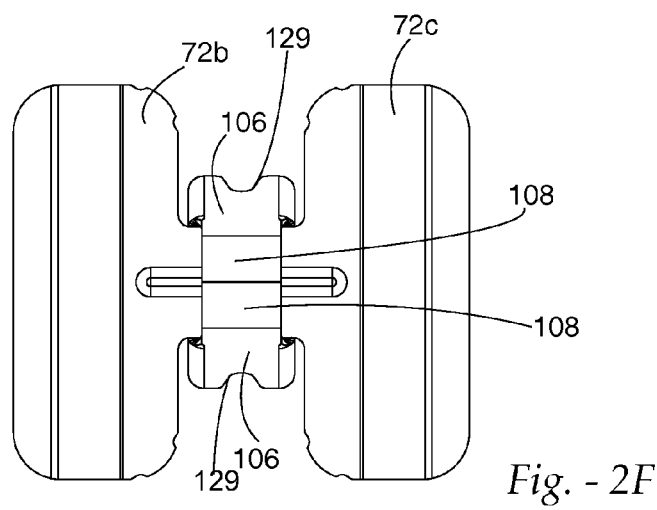
FIG. 2F is a back view of the fastener.

Reference is briefly made to FIG. 2E, which illustrates the positional relationship between the two clips 90a and 90b of a single fastener 70. As can be seen each of the center legs 100 is angled inwardly from the base plate relative to axis (or plane) 110 at an angle designated by the letter A (or –A as the case may be). Each of the clips together form a V-shape with the respective corners 108 touching or very closely spaced apart. Further, in the rest position for each outer leg 106, that is, with each outer leg in an unstressed condition, each outer leg is positioned substantially parallel to its corresponding center leg 100 and at approximately the same angle A (or –A), relative to axis 75. In practice the angle A will vary in proportion to the insertion force desired or required. In the preferred embodiment, the angle A is approximately 19±5 degrees.

FIGS. 2A and 2E illustrate other features of each outer leg 106. The end region 120 of each outer leg is wedge-shaped when viewed in profile from a side. More particularly, the end region 120 of each outer leg includes an engagement surface or end 122 and two opposing triangularly shaped extensions 124, which are identical in shape and are bent downwardly to form the wedge-shape of the end region 120. Each of the triangularly shaped extensions 124 includes a lower edge 123, which is generally perpendicular to the center portion of the fastener, and an upper ramped or wedge portion 125, which transitions into a blunt end or stop feature 127. Each triangularly shaped extension 124 permits the end region 120 to have a wider profile, see numeral 126, in the end region of each outer leg than the profile at an inner or narrower section identified by numeral 128 (as shown in FIGS. 2A and 2D and others). This wide profile or surface assists in forming the stop feature of the fastener, which also acts as a clamping surface.

When each triangularly shaped extension 124 is bent downwardly, they are positioned generally perpendicular to a center portion-top 106' (see FIG. 2A) of each outer leg 106 and when inserted into a hole in the mounting surface are squeezed together to over-travel or move past relative to a respective center leg 100. The blunt end or stop feature 127 is received outside of the mouth of the material forming opening 204 and also functions to prevent the clamps or wings 90a and 90b from spreading apart when a pulling force is applied to the fastener 70 in a direction opposite to arrow 210 (see FIG. 3). With the fastener in an engaged position, the end or stop feature is orientated generally parallel to the mounting surface. The ramped portion 125 of each end region 120 has an effective wider diameter than the blunt end 127 and permits the fastener to engage with a larger sized hole such as hole 204 in the mounting surface of the structural member, that is, if the hole has a diameter greater than the spacing between the two blunt ends 127. Further, each end region includes a generally oblong or oval opening such as a V-shaped opening or groove 129, the purpose of which is to provide a space, in cooperation with opening 104, to permit entry of one of the tips 308 or 310 of a disassembly tool 300 so that each tip can be manipulated behind or on the top of a respective outer leg 106 in a position to apply a clamping or inwardly directed force to that leg 106.

Figure 6:
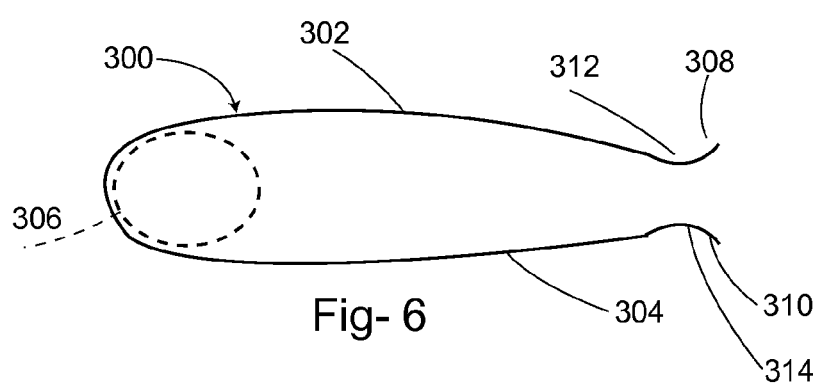
FIG. 6 shows a removal tool that can be used with the fastener of the present invention.
Figure 7A:
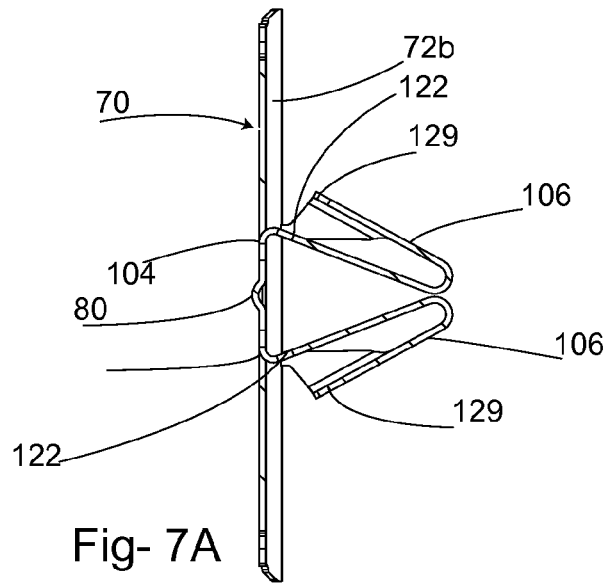
FIG. 7A shows a cross-sectional view of the fastener.
Figure 7B:
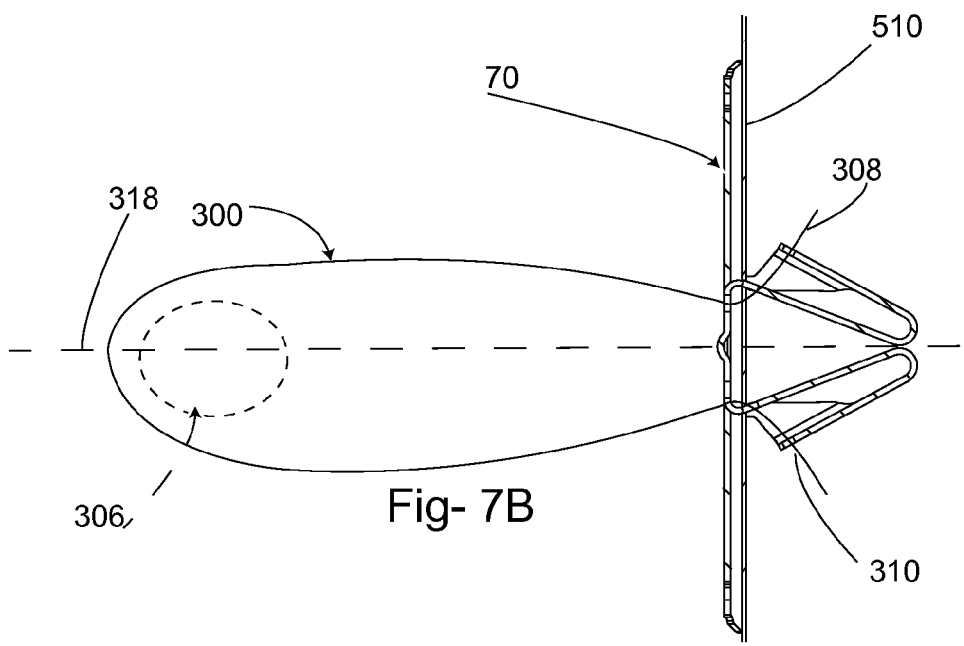
FIG. 7B diagrammatically shows the removal tool in the fastener prior to removal of the fastener from a mounting surface.

The removal tool 300, see FIGS. 6A and B, is made of a resilient, spring-like body with two extending legs 302 and 304. The tool is preferably formed of a resilient metal wire or with a less flexible wire and also includes an optional center coiled spring 306, to enhance the spring constant of the tool. The center coiled spring 306 can be integrally formed within the legs or formed as an insert inserted in between the legs of the tool. Each tip (tip end) 308 and 310 of the tool includes a concave section 312 and 314 downstream of each tip end. To remove the fastener from the mounting surface, each tip 308 and 310 is placed within a corresponding opening 128. To accomplish this, the tool is pushed into the fastener and the tip ends 308 and 310 inserted into the opening 104 which are accessible from the front side (the side facing the passenger compartment) and will be in the orientation shown in FIG. 2C. As the tool is pushed further into the fastener each concave section 312 and 314 engages a portion or edge of a respective outer leg 106, which forms in inner portion of opening 104. This portion of the outer leg is designated by numeral 122. The engagement of each concave section with a corresponding section, edge or surface 122 of an outer leg 106 adjacent opening 104 permits the concave sections to ride up onto opening 129 and then over the end or outer portions of each outer leg. This position is shown in FIG. 7B. Thereafter the tool is twisted about its longitudinal axis 318, such action causing the concave sections to move closer together, which in turn pinches the outer legs 106 together due to the compressive force generated by the tool enabling the removal of the fastener 70.

Figure 3:
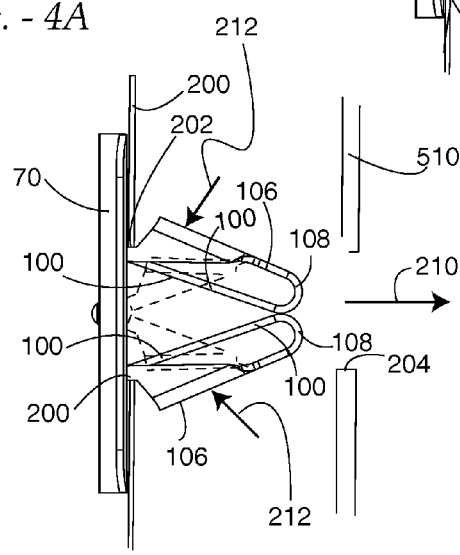
FIG. 3 shows the fastener displaced from a mounting surface such as the roof rail of a vehicle and aligned with a fastener-receiving opening in the roof rail.
Figure 1A:
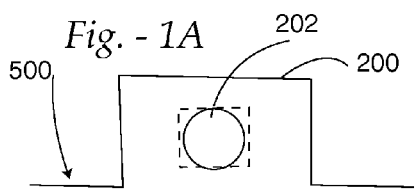
FIG. 1A is a front view of a tab of a prior art curtain air bag usable with the fastener of the present invention.
Figure 1B:
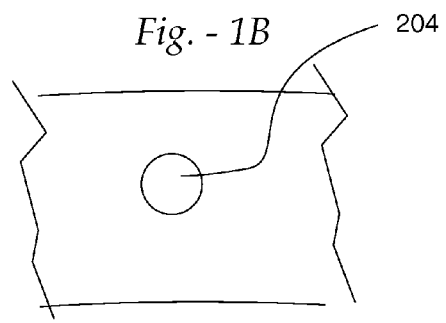
FIG. 1B is a front view of a typical opening in the structural member in which the fastener according to the invention is inserted.

FIG. 3 illustrates one of fasteners 70 already positioned within a tab 200 of a curtain air bag 500 generally of the shape and construction shown in FIG. 5B. Each tab 200 includes a fastener receiving opening 202 such as a circular or square shaped opening as shown in FIG. 1A (the square shaped opening is shown in phantom line). FIG. 3 also shows a fastener 70 spaced apart from the mounting surface such as the roof rail 510 of a vehicle. The roof rail shown includes another fastener receiving opening, which in FIGS. 3 and 4B is circular and identified by numeral 204 (also shown in FIG. 1B). As the tab of a woven air bag is generally flexible and exhibits some degree of stretch, the opening 202 can be smaller than opening 204 if desired. When each fastener 70 is mounted to the mounting surface it is positioned relative to a corresponding opening 204 (after the air bag tab 200 has been attached) and moved toward the mounting surface/structural member (roof rail) until each outer leg 106 engages with the material forming the edge of opening 204. The deflected position of each clip 90a and 90b (that is its outer leg) is achieved as each clip is compressed during installation as shown in phantom line.

Further movement the fastener 70 in the direction of arrow 210 will generate compressive forces designated by arrows 212 (see FIG. 3) that act upon each outer leg 106. These forces will close any spacing in between the opposing corners 108 of each of the clips 90a and 90b and thereafter cause each outer leg 106 to rotate or otherwise move inwardly about the corner 108, which acts as an integral hinge, such that end regions 120 of each clip 90a and 90b move closer to each other. In the limiting position, an inner surface of each end region will contact a top surface of a corresponding center leg. This movement will temporarily reduce the distance between the outer regions of each outer leg 106 to a dimension smaller than the diameter of opening 204; that is, the end regions 120 over-travel their respective center leg 100. Further movement of each clip 70 into the roof rail will position the wider profile 126 (the ramp 125) of each outer leg 106 behind the material of the roof rail forming an opening 204. At this point each clip 90a and 90b will snap outwardly, due to the resilient spring-like action of the legs 106, generally opposite arrows 212, generally to the position shown in FIGS. 4A and 4B, clamping the air bag tab to the structural member and preventing removal of the fastener from the mounting surface.

Figure 4A:
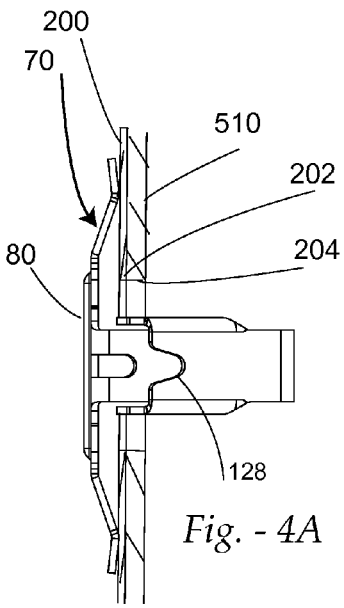
FIGS. 4A and 4B show the fastener positioned through an opening in the tab of the air bag and mounted to the roof rail of a vehicle.
Figure 4B:
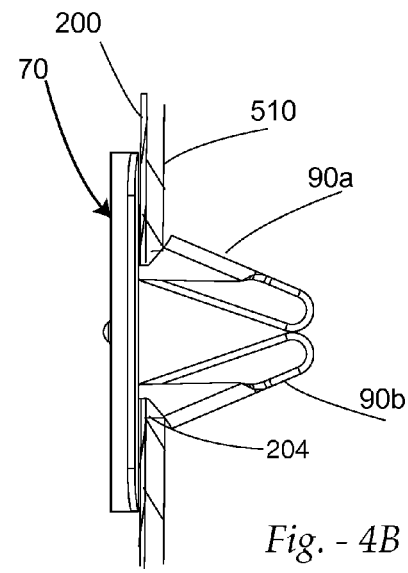

In this mounted position, as can be seen from FIGS. 4A and 4B, the rear side of the base plate (as well as the rear side of the side portions 72b and 72c) acts as a first stop surface or mechanical stop, and the end region 120 (profile or surface 127 and/or surface 125) of each outer leg acts as a second stop surface or mechanical stop preventing the withdrawal of the fastener and securing the air bag to the selected mounting surface such as the roof rail or other structural member of the vehicle.

One of the benefits of the present invention in utilizing the fastener formed with two resilient clips such as 90a or 90b is that the fastener 70 can be easily removed from the structural member, such as the vehicle roof rail or other mounting surface. The demounting or removal of each fastener 70 can be accomplished as mentioned by utilizing an elongated tool 300 as shown in FIG. 6 received in the designated openings in the fastener or, alternatively, by utilizing a screwdriver or a pair of pliers with two thin elongated tips. The tips of the tool (screwdriver, Allen key (or wrench) or pliers) are manipulated between the edges of opening 204 and the top of each center region 106' of each outer leg 106. The tips are moved in concert to compress both outer legs 106 so as to compress clips 90a and 90b to profile smaller than the diameter of opening 204, thereby permitting the withdrawal or removal of fastener 70 from the structural member. Another benefit of the present fastener is the ability of the outer legs to over-travel the center portion of the leg, which permits the fastener to collapse to a small dimension permitting the fastener to enter into a relatively small opening in the mounting surface.

Many changes and modifications in the above-described embodiment of the invention can, of course, be carried out without departing from the scope thereof. Accordingly, that scope is intended to be limited only by the scope of the appended claims.

The invention claimed is:

1. An air bag assembly mounting system comprising: a fastener (70) having a base plate (72) with a front side and a rear side, a resilient expansion element (90) along the rear side of the base plate which is configured to extend through an opening (204) in a mounting surface (510) in a vehicle and through a portion of an air bag (200) or an air bag cover, so as to clamp the air bag or cover to the mounting surface (510) between a second or rear side of the base plate and the mounting surface with the expansion element on an opposite side of the mounting surface, the resilient expansion element comprising two opposing resilient clips (90a, 90b) each having a center or inner leg extending from the base plate and an outer leg resiliently supported by and configured as an extension of the center or inner leg, the outer leg, at a distal end, including an engagement surface adapted to engage an edge of an opening in the mounting surface, each engagement surface of each outer leg configured to move closer to each other during assembly of the fastener to the mounting surface to a reduced dimension enabling insertion of the fastener into the mounting surface opening and to assume a released position wider than the mounting surface opening upon insertion therein;

wherein each outer leg proximate the engagement surface thereof includes a first opening to facilitate insertion of a portion of a removal tool in a direction from exterior of the mounting surface into the mounting surface, the tool adapted to move each outer leg together to a compressed position.

2. The assembly according to claim 1 wherein the opening in the outer leg is a V-shaped slot, oval or elongated opening.

3. The assembly according to claim 1 wherein each outer leg proximate a distal end includes bent-over wedge shaped wings which over-travel a corresponding center leg during installation of the fastener.

4. The assembly according to claim 3 wherein the base plate opposite the slot or opening in the outer leg (106) includes a corresponding second opening (104) adapted to also receive a portion of the removal tool (300).

5. The assembly according to claim 4 wherein the second opening is located in the base plate and extends through a root portion of a respective center leg.

6. The assembly according to claim 5 wherein the removal tool includes opposing arcuately shaped opposed curved tip ends serially receivable into one of the second openings and then into one of the first openings.

7. The assembly according to claim 6 wherein the removal tool is configured so that on rotation about a longitudinal axis the tip ends move close to each other to compress the outer legs together.

8. The assembly according to claim 6 wherein each second opening is generally in line with a corresponding first opening.

9. A fastener (70) and removal tool (300) for fastening an air bag to a mounting surface and removing the fastener, the mounting surface having a first fastener opening (204) of predetermined dimension and the air bag having a fastener receiving opening (202), the fastener comprising: a base plate (72) with a first front side and a second or rear side, the base plate including a center portion (70a) and two opposing lateral sections (70b) and (70c) located on opposing lateral sides of the center portion along a first or lateral axis (74), and a resilient expansion element (90); the resilient expansion element configured to extend through the fastener receiving opening in a portion (202) of the air bag and also through the opening (204) in the mounting surface, so as to hold the air bag in a desired position clamped between the second or rear side of the base plate and the mounting surface, the resilient expansion element (90) comprising two co-acting resilient clips (90a, 90b) each clip extending away from the second or rear side of the base plate and arranged along a second axis (75) disposed generally 90 degrees to the first axis, each clip movable between an unstressed position and a compressed position, when in the compressed position each clip is able to fit into the opening on the mounting surface and through the fastener receiving opening of the air bag, each clip having a stop feature (127) relatively movable along a third axis (73) perpendicular to each of the first and second axes between the unstressed position and the compressed position, each clip having a center leg (100) extending from the base plate along the second axis and arranged at a predetermined angle to the second axis, each clip further including an outer leg (106) resiliently supported by its center leg (100) and formed as an extension of the outer leg, the outer leg at an outer region (120) thereof including an engagement surface and a set of opposing bent wings (124), each wing at a distal end thereof including the stop feature (127), the resilient expansion element movable into the opening of the mounting surface along the second axis (74) in a first direction, and when the resilient clips are in the unstressed position, the fastener is prevented from moving out of the mounting surface in a direction opposite to the first direction by interaction of the stop feature (127) and the mounting surface, when the fastener is installed the stop feature is oriented generally parallel to the mounting surface, wherein each outer region (12) at a respective engagement surface including a first opening (129), adapted to receive a portion of a removal tool (300), such removal tool is received through the first opening to engage the engagement surface.

10. The fastener according to claim 9 wherein each set of extending wings (124) extends generally perpendicularly from a particular inner portion (128) a respective outer leg (106) in a direction generally along the third axis, each set of wings during assembly to a structural member adapted to move relative to the center leg (100) and over-travel the center leg to reduce a dimension between the wing of one outer leg and the wing of the other the outer leg of each clip, permitting insertion of the fastener into the mounting surface.

11. The fastener according to claim 9 wherein each center leg is disposed at an equal and opposite angle relative to the second axis.

12. The fastener according to claim 9 wherein the center legs and the corresponding wings (124) are configured to move opposite to each other and when moved to the compressed position over-travel the center leg (100) to reduce a dimension between each of the wings to enable both wings to be inserted into the opening in the mounting surface.

13. The fastener according to claim 12 wherein each wing (124) includes a ramped surface (125) extending toward the second side of the base plate and wherein the stop feature is formed by an end surface (127) extending from the ramp surface and oriented generally parallel to the second side when in a stop or blocking position.

14. An air bag assembly mounting system comprising:

a fastener (70) having a base plate (72) with a front side and a rear side, a resilient expansion element (90) along the rear side of the base plate which is configured to extend through an opening (204) in a mounting surface (510) in a receiving member and through a portion of an air bag (200) or an air bag cover, so as to clamp the air bag or cover to the mounting surface (510) between a second or rear side of the base plate and the mounting surface with the expansion element on an opposite side of the mounting surface, the resilient expansion element comprising two opposing resilient clips (90a, 90b) each having a center or inner leg extending from the base plate and an outer leg resiliently supported by and configured as an extension of the center or inner leg, the outer leg, at a distal end, including an engagement surface adapted to engage an edge of an opening in the mounting surface, each engagement surface of each outer leg configured to move closer to each other during assembly of the fastener to the mounting surface to a reduced dimension enabling insertion of the fastener into the mounting surface opening and to assume a released position wider than the mounting surface opening upon insertion therein;

wherein each outer leg proximate the engagement surface thereof includes a first opening to facilitate insertion of a portion of a removal tool in a direction from exterior of the mounting surface into the mounting surface, each outer leg configured to move toward a compressed position by the tool.

* * * * *